United States Patent [19]

Yaguchi et al.

[11] Patent Number: 4,590,584
[45] Date of Patent: May 20, 1986

[54] METHOD AND SYSTEM FOR PROCESSING EXPONENTS IN FLOATING-POINT MULTIPLICATION

[75] Inventors: Toshiyuki Yaguchi, Yokohama; Akira Kanuma, Zushi; Kiichiro Tamaru, Tokyo, all of Japan

[73] Assignee: Tokyo Shibaura Denki Kabushiki Kaisha, Kawasaki, Japan

[21] Appl. No.: 562,736

[22] Filed: Dec. 19, 1983

[30] Foreign Application Priority Data

Dec. 24, 1982 [JP] Japan ................. 57-228002

[51] Int. Cl.$^4$ .............................. G06F 7/52
[52] U.S. Cl. ................................... 364/748
[58] Field of Search ............ 364/748, 757, 786

[56] References Cited

U.S. PATENT DOCUMENTS 4,366,548 12/1982 Kregness et al. ............ 364/748
4,429,370 1/1984 Blau et al. .................... 364/748
4,511,990 4/1985 Hagiwara et al. ............ 364/748

OTHER PUBLICATIONS

Ahearn et al., "Characteristic Overflow or Underflow Detection in Floating Point Operations", *IBM Tech. Disclosure Bulletin*, vol. 7, No. 8, Jan. 1965, pp. 664–665.
Hale et al., "Biased and Non-Biased Binary Conversion and Exponent Under/Over Flow Detection", *IBM Tech. Disclosure Bulletin*, vol. 23, No. 1, Jun. 1980, pp. 252–254.
Nave & Palmer, "A Numeric Data Processor", IEEE Int'l Solid-State Circuits Conf., Feb. 1980.
"iAPX 86/20; iAPX 88/20; Numeric Data Processor", Intel Component Data Catalog, Jul. 1981.

*Primary Examiner*—David H. Malzahn
*Attorney, Agent, or Firm*—Schwartz, Jeffery, Schwaab, Mack, Blumenthal & Evans

[57] ABSTRACT

In floating-point multiplication, the sum of the exponents of the two operands is determined by the use of a single adder. The exponents are modified either before they are inputted to the adder or at the output of the adder. A carry signal of "1" is applied whenever addition is carried out. A signal indicative of occurrence of underflow or overflow is also obtained.

7 Claims, 3 Drawing Figures

FIG. 1
S   E   F
1 BIT   n BITS   m BITS
FIG. 2
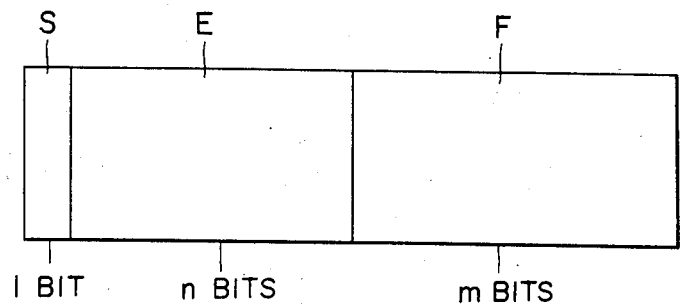
FIG. 3
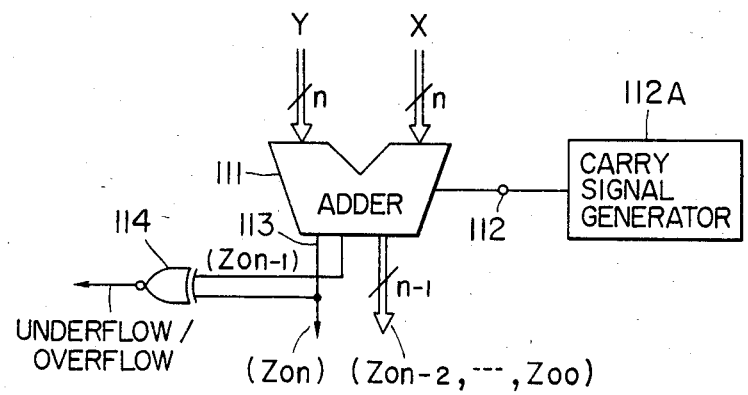

METHOD AND SYSTEM FOR PROCESSING EXPONENTS IN FLOATING-POINT MULTIPLICATION

BACKGROUND OF THE INVENTION

The present invention relates to a method and a system for processing exponents in a floating-point multiplication system in accordance with the proposed IEEE (The Institute of Electrical and Electronics Engineers) Standard, and particularly such a multiplication system formed of semiconductor integrated circuits (ICs).

According to the proposed IEEE Standard, each operand is represented in a form shown in FIG. 1. S denotes a sign bit. The field E is for an exponent of n (e.g., 8) bits whose value is biased by $B = 2^{n-1} - 1$ (e.g., $2^7 - 1 = 127$). The field F is for a fraction of m (e.g., 23) bits which forms together with an implied "1" a mantissa of a value 1.F. A normalized non-zero number as represented by the format of FIG. 1 has therefore a value:

$$(-1)^{S*} 2^{E-B} * (1.F)$$

In performing a multiplication on two operands of the format described, processing of the exponents is made in the following manner. Assume that X and Y respectively denote the exponents of the two operands and Z denotes the exponent (before taking account of the effect of carry and borrow) of the result of the multiplication, i.e., the product. Then, the following relationship holds:

$$(X-B)+(Y-B)=Z-B$$

The left side of the above equation can be transformed as follows:

$$(X-B)+(Y-B)=(X+Y-B)-B$$

Therefore, $$Z=X+Y-B$$

This means that by determining Z in accordance with this equation, the desired value of the exponent (before taking account of the carry, etc. due to the processing of the mantissas) of the product is obtained. In other words, the processing of the exponents or "addition of the exponents" is accomplished.

In a conventional method, the addition of the exponents is done by using two ALUs (arithmetic logic units). A first ALU adds the exponents X, Y of n bits and outputs a value (X+Y) of n bits. A second ALU adds the output (X+Y) of the first ALU and 2's complement of B to output a value (X+Y−B).

Thus, in a conventioal system for performing multiplication of floating-point numbers of the proposed IEEE Standard, two ALUs are used for the addition of the exponents. As a result, the entire circuitry is complicated, and is of a large size, and hence its power consumption is large and time necessary for the processing is long.

SUMMARY OF THE INVENTION

An object of the invention is to provide a method and a system for processing exponents in floating-point multiplication in which the addition of the exponents can be accomplished by a single ALU, so that the circuitry is simpler and its power consumption is smaller, and the time for the processing is shorter.

According to one aspect of the invention, there is provided an exponent processing method in floating-point multiplication determining a product of two operands of floating-point format, said exponent processing method being for determining a sum Z of exponents X and Y of n bits of the two operands, and comprising:

applying an inversion of the MSB, i.e., (n−1)-th bit of one of the exponents (e.g., X) to the n-th bit and the (n−1)-th bit of a first input terminal set of an adder capable of performing an addition of (n+1) bits, applying all the bits except the MSB, i.e., the (n−2)-th to 0-th bits of the exponent (X) to the (n−2)-th to 0-th bits of said first input terminal set, applying a signal "0" to the n-th bit of a second input terminal set of the adder, applying all the bits, i.e., the (n−1)-th to the 0-th bits of the other exponent (Y) to the (n−1)-th to the 0-th bits of said second input terminal set, applying a signal "1" to a carry input terminal of the adder, and using the (n−1)-th to the 0-th bits of the output of the adder as bits constituting the sum Z.

According to another aspect of the invention, there is provided an exponent processing system in a floating-point multiplication system determining a product of two operands of floating-point format, said exponent processing system being for determining a sum Z of exponents X and Y of n bits of the two operands, and comprising:

an adder capable of performing addition of at least (n+1) bits, a carry signal generator for supplying a signal "1" to a carry input terminal of said adder, and an inverter for inverting the MSB or the (n−1)-th bit of the exponent (e.g., X) of a first operand, said adder receiving, at the n-th and the (n−1)-th bits of its first input terminal set, the output of said inverter, and, at the (n−2)-th to the 0-th bits of its first input terminal set, the (n−2)-th to the 0-th bits of the exponent (X) of said first operand, said adder receiving, at the n-th bit of its second input terminal set, a signal "0", and at the (n−1)-th to the 0-th bits of its second input terminal set, all the bits, i.e., the (n−1)-th to the 0-th bits of the exponent (Y) of a second operand, the (n−1)-th to the 0-th bits of the output of said adder being used to form the sum Z.

According to a further aspect of the invention, there is provided an exponent processing method in floating-point multiplication determining a product of two operands of floating-point format, said exponent processing method being for determining a sum Z of exponents X and Y of n bits of the two operands, and comprising:

inputting the exponents X and Y to the (n−1)-th to the 0-th bits of two input terminal sets of an adder capable of performing addition of at least n bits, inputting a signal "1" to a carry input terminal of the adder, and using the n-th bit ($Z_{0n}$) of the output of the adder as the MSB, i.e., the (n−1)-th bit ($Z_{n-1}$) of the sum Z, and the (n−2)-th to the 0-th bits ($Z_{0n-2} \ldots Z_{00}$) of the output of the adder as the (n−2)-th to the 0-th bits ($Z_{n-2} \ldots Z_0$) of the sum Z.

According to a still further aspect of the invention, there is provided an exponent processing system in a floating-point multiplication system determining a product of two operands of floating-point format, said exponent processing system being for determining a sum Z of exponents X and Y of n bits of the two operands, and comprising:

an adder capable of performing addition of at least n bits, and receiving at the (n−1)-th to the 0-th bits of its input terminal sets, the exponents X and Y, and a carry signal generator for supplying a signal "1" to a carry input terminal of said adder, wherein the n-th bit $Z_{0n}$ of the output of the adder is used as the MSB, i.e., the (n−1)-th bit $Z_{n-1}$ of the sum Z, and the (n−2)-th to the 0-th bits $Z_{0n-2} \ldots Z_{00}$ of the output of the adder are used as the (n−2)-th to the 0-th bits of the sum Z.

BRIEF DESCRIPTION OF THE DRAWINGS

In the accompanying drawings:

FIG. 1 shows a format for representation of a floating-point number in accordance with the proposed IEEE Standard;

FIG. 2 is a block diagram showing an embodiment of an exponent processing system according to the invention; and FIG. 3 is a block diagram showing another embodiment of an exponent processing system according to the invention.

DESCRIPTION OF THE PREFERRED EMBODIMENTS

FIG. 2 shows an embodiment of the invention. In this embodiment, one of the exponents is modified before it is inputted to an adder. More particularly, an ALU or adder 101 performing addition of n+1 bits is used. Applied to the lower-digit (n−1) bits, i.e., the (n−2)-th to the 0-th bits of a first input terminal set of the adder 101 are the (n−2)-th to the 0-th bits, i.e., all the bits except the MSB of the exponent X of one operand. The MSB, i.e., the (n−1)-th bit of the exponent X is inverted by an inverter 103 and is applied to the higher-digit 2 bits, i.e., the n-th and the (n−1)-th bits of the first input terminal set of the adder 101. Applied to the lower-digit n-bits, i.e., the (n−1)-th to the 0-th bits of a second input terminal set of the adder 101 are all the bits, i.e., the (n−1)-th to the 0-th bits of the exponent Y of another operand. A signal of a value "0" is applied, whenever addition is carried out, to the highest-digit bit, i.e., the n-th bit of the second input terminal set.

On the other hand a signal of a value "1" is applied, whenever addition is effected, to a carry input terminal 102 from a carry signal generator 102A.

With this arrangement, data of n bits forming the desired result Z are obtained at the (n−1)-th to the 0-th bits of the output terminal set of the adder 101 and a signal indicative of underflow or overflow (whose value is "1" when underflow or overflow occurs) is obtained at the n-th bit (MSB) of the output terminal set.

Now the principle of the system of FIG. 2 is explained. As was described, the addition of the exponents is realized by the determination of X+Y−B. This will be transformed to:

$$(X+Y-B)=(X-B-1)+Y+1$$

In the embodiment of FIG. 2, a signal indicative of (X−B−1) is effectively applied to the first input terminal, while Y and "1" are applied to the second input terminal and the carry input terminal 102. The reason why the signal as applied to the first input terminal represents (X−B−1) will now be explained.

The base B is defined by:

$$B = 2^{n-1} - 1 \\ = 2^{n-2} + 2^{n-3} + \ldots + 2^1 + 2^0 \quad (1)$$

From the equation (1), it will be seen that 2's complement of B is therefore given by:

$$(\text{2's complement of } B) = 2^n + 2^{n-1} + 1 \quad (2)$$

Assume X is represented by:

$$X = X_{n-1}2^{n-1} + X_{n-2}2^{n-2} + \ldots + X_1 2^1 + X_0 2^0 \quad (3)$$

From equations (1), (2), (3), $$X - B - 1 = 2^n + (1 + X_{n-1})2^{n-1} + X_{n-2}2^{n-2} + \\ X_{n-3}2^{n-3} + \ldots + X_1 2^1 + X_0 2^0 \quad (4)$$

When $X_{n-1} = 0$ $$X - B - 1 = 2^n + 2^{n-1} + X_{n-2}2^{n-2} + \ldots + X_0 2^0 \quad (5)$$

When $X_{n-1} = 1$ $$X - B - 1 = 2^n + 2^n + X_{n-2}2^{n-2} + \ldots + X_0 2^0 \quad (6)$$

Thus, it will be seen that the n-th and (n−1)-th bits of (X−B−1) are both "1" when $X_{n-1} = 0$, while they are both "0" when $X_{n-1} = 1$. Therefore, if the MSB of X is inverted and is used as the n-th and (n−1)-th bits of an input to the adder 101 and the (n−2)-th to 0-th bits of X are used as the (n−2)-th to 0-th bits of the input to the adder 101, such an input constitutes (X−B−1). By application of this input, together with Y at another input, and "1" at the carry input, the output representing Z=X+Y−B is obtained.

FIG. 3 shows another embodiment of the invention. In this embodiment, an adder 111 performing addition of n bits is used, and the output of the adder 111 is modified. More particularly, exponents X, Y of the operands are inputted to the two input terminal sets of the adder 111, and a signal of a value "1" is supplied from a carry signal generator 112A to a carry input terminal 112. The carry output signal from a carry output terminal 113 is used as the MSB, i.e., (n−1)-th bit of the sum Z, while the lower-digit (n−1) bits, i.e., the (n−1)-th to the 0-th bits of the output terminal set is used as the lower-digit (n−1) bits of the sum Z. The higher-digit two bits, i.e., the (n−1)-th and the n-th bits of the output of the adder 111 are applied to an exclusive-NOR gate, i.e., a coincident logic circuit 114, whose output serves to indicate occurrence of underflow or overflow.

The principle of the embodiment of FIG. 3 will now be explained. As was mentioned, the desired result or sum Z is given by:

$$Z = X + Y - B \quad (7)$$

If X, Y are applied to the inputs of the adder 111, and "1" is applied to the carry input, the output $Z_0$, including the carry output, of the adder 111 will be given by:

$$Z_0 = X + Y + 1 \quad (8)$$
$$= (X + Y - B) + B + 1$$
$$= Z + B + 1$$

The base B is defined by:

$$B = 2^{n-1} - 1$$

The equation (8) can therefore be transformed to:

$$Z_0 = Z + 2^{n-1} - 1 + 1 \quad (9)$$
$$= Z + 2^{n-1}$$

If Z and $Z_0$ are respectively defined by:

$$Z = Z_{n-1}2^{n-2} + Z_{n-2}2^{n-2} + \ldots + Z_02^0 \quad (10)$$

$$Z_0 = Z_{0n}2^n + Z_{0n-1}2^{n-1} + Z_{0n-2}2^{n-2} + \ldots + Z_{00}2^0 \quad (11)$$

It will be seen from the equations (9), (10), (11) that: when $Z_{n-1}=0$, then $Z_{0n}=0$, $Z_{0n-1}=1$ and when $Z_{n-1}=1$, then $Z_{0n}=1$, $Z_{0n-1}=0$, unless underflow or overflow is taking place. Thus, $Z_{n-1}=Z_{0n}$. It will therefore be appreciated that by using $Z_{0n}$ as $Z_{n-1}$, and $Z_{0n-2}, \ldots Z_{00}$ as $Z_{n-2}, \ldots Z_0$, the desired sum Z can be obtained.

When both of $Z_{0n}$ and $Z_{0n-1}$ are "0" or "1", it signifies that underflow or overflow is taking place. The output of the exclusive-NOR gate 114 receiving $Z_{0n}$ and $Z_{0n-1}$ is "1" when $Z_{0n}$ and $Z_{0n-1}$ are both "0" or both "1" and is therefore used as a signal indicative of underflow or overflow. Upon recognition of underflow or overflow, the output formed of $Z_{0n}, Z_{0n-2}, \ldots Z_{00}$ is disregarded.

An adder of (n+1) bits is used in the embodiment of FIG. 2 while an adder of n bits is used in the embodiment of FIG. 3. But in either embodiment, an adder of a larger number of bits may alternatively be used. In such a case "0" may be applied to each of extra bits. In the embodiment of FIG. 3, the carry output is used as $Z_{n-1}$. But where an adder having more than n bits is used, the output of n-th bit can be used as $Z_{n-1}$. The expression "n-th bit" as used in the claims should be construed to cover a carry output where the adder is of n bits.

As has been described, the invention makes it possible to accomplish addition of exponents by the use of a sole adder or ALU, with means for modifying one of the exponents at the input of the ALU or means for modifying the output of the ALU. The circuitry is therefore simple, the power consumption is reduced and the time for the operation is shorter.

What is claimed is:

1. An exponent processing method in floating-point multiplication determining a product of two operands of floating-point format, said exponent processing method being for determining a sum Z of exponents X and Y of n bits of the two operands, and comprising:

applying an inversion of the MSB, i.e., (n−1)-th bit of one of the exponents (e.g., X) to the n-th bit and the (n−1)-th bit of a first input terminal set of an adder capable of performing an addition of (n+1) bits, applying all the bits except the MSB, i.e., the (n−2)-th to 0-th bits of the exponent (X) to the (n−2)-th to 0-th bits of said first input terminal set, applying a signal "0" to the n-th bit of a second input terminal set of the adder, applying all the bits, i.e., the (n−1)-th to the 0-th bits of the other exponent (Y) to the (n−1)-th to the 0-th bits of said second input terminal set, applying a signal "1" to a carry input terminal of the adder, and using the (n−1)-th to the 0-th bits of the output of the adder as bits constituting the sum Z.

2. A method according to claim 1, further comprising:

judging that underflow or overflow is taking place when the n-th bit of the output of the adder is "1".

3. An exponent processing system in a floating-point multiplication system determining a product of two operands of floating-point format, said exponent processing system being for determining a sum Z of exponents X and Y of n bits of the two operands, and comprising:

an adder capable of performing addition of at least (n+1) bits, a carry signal generator for supplying a signal "1" to a carry input terminal of said adder, and an inverter for inverting the MSB i.e., the (n−1)-th bit of the exponent (e.g., X) of a first operand, said adder receiving, at the n-th and the (n−1)-th bits of its first input terminal set, the output of said inverter, and, at the (n−2)-th to the 0-th bits of its first input terminal set, the (n−2)-th to the 0-th bits of the exponent (X) of said first operand, said adder receiving, at the n-th bit of its second input terminal set, a signal "0", and at the (n−1)-th to the 0-th bits of its second input terminal set, all the bits, i.e., the (n−1)-th to the 0-th bits of the exponent (Y) of a second operand, the (n−1)-th to the 0-th bits of the output of said adder being used to form the sum Z.

4. An exponent processing method in floating-point multiplication determining a product of two operands of floating-point format, said exponent processing method being for determining a sum Z of exponents X and Y of n bits of the two operands, and comprising:

inputting the exponents X and Y to the (n−1)-th to the 0-th bits of two input terminal sets of an adder capable of performing addition of at least n bits, inputting a signal "1" to a carry input terminal of the adder, and using the n-th bit ($Z_{0n}$) of the output of the adder as the MSB, i.e., the (n−1)-th bit ($Z_{n-1}$) of the sum Z, and the (n−2)-th to the 0-th bits ($Z_{0n-2} \ldots Z_{00}$) of the output of the adder as the (n−2)-th to the 0-th bits ($Z_{n-2} \ldots Z_0$) of the sum Z.

5. A method according to claim 4, further comprising:

judging that underflow or overflow is taking place when the n-th and the (n−1)-th bits $Z_{0n}, Z_{0n-1}$ of the output of the adder coincide with each other.

6. An exponent processing system in a floating-point multiplication system determining a product of two operands of floating-point format, said exponent processing system being for determining a sum Z of exponents X and Y of n bits of the two operands, and comprising:

an adder capable of performing addition of at least n bits, and receiving at the (n−1)-th to the 0-th bits of its input terminal sets, the exponents X and Y, and a carry signal generator for supplying a signal "1" to a carry input terminal of said adder, wherein the n-th bit $Z_{0n}$ of the output of the adder is used as the MSB, i.e., the (n−1)-th bit $Z_{n-1}$ of the sum Z, and the (n−2)-th to the 0-th bits $Z_{0n-2}\ldots$ $Z_{00}$ of the output of the adder are used as the (n−2)-th to the 0-th bits of the sum Z.

7. A system according to claim 6, further comprising:

an Exclusive-NOR gate receiving the n-th and the (n−1)-th bits of the output of the adder, and providing, at its output, a signal indicative of occurrence of underflow or overflow.

* * * * *